United States Patent
Rajpathak et al.

(10) Patent No.: US 12,443,760 B2
(45) Date of Patent: Oct. 14, 2025

(54) DETECTION OF ELECTROMAGNETIC FAULT INJECTION ATTACKS ON DIGITAL SYSTEMS

(71) Applicant: NVIDIA Corp., Santa Clara, CA (US)

(72) Inventors: Kedar Rajpathak, Bengaluru (IN); Tezaswi Raja, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 399 days.

(21) Appl. No.: 17/954,616

(22) Filed: Sep. 28, 2022

(65) Prior Publication Data

US 2024/0104252 A1    Mar. 28, 2024

(51) Int. Cl.
   *H04L 9/00* (2022.01)
   *G06F 21/52* (2013.01)
   *G06F 21/75* (2013.01)

(52) U.S. Cl.
   CPC ............ *G06F 21/755* (2017.08); *G06F 21/52* (2013.01); *G06F 2221/034* (2013.01)

(58) Field of Classification Search
   CPC .. G06F 21/755; G06F 21/52; G06F 2221/034; G06F 21/75
   See application file for complete search history.

(56) References Cited

U.S. PATENT DOCUMENTS

| | | | |
|---|---|---|---|
| 2020/0043868 A1* | 2/2020 | Apte | H01L 23/552 |
| 2023/0253779 A1* | 8/2023 | Nemiroff | G06F 21/552 361/92 |
| 2024/0386145 A1* | 11/2024 | Pedersen | G06F 1/10 |

OTHER PUBLICATIONS

Trouchkine, et al., "Electromagnetic Fault Injection Against a System-on-Chip, Toward New Micro-Architectural Fault Models," arXiv:1910.11566v1 (arXiv, Oct. 2019).

Ordas, et al., "EM Injection: Fault Model and Locality," Fault Diagnosis and Tolerance in Cryptography, pp. 3-13 (HAL Open Science, Sep. 2015).

* cited by examiner

*Primary Examiner* — Syed M Ahsan

(57) ABSTRACT

Techniques are described for detecting an electromagnetic ("EM") fault injection attack directed toward circuitry in a target digital system. In various embodiments, a first node may be coupled to first driving circuitry, and a second node may be coupled to second driving circuitry. The driving circuitry is implemented in a manner such that a logic state on the second node has greater sensitivity to an EM pulse than has a logic state on the first node. Comparison circuitry may be coupled to the first and to the second nodes to assert an attack detection output responsive to sensing a logic state on the second node that is unexpected relative to a logic state on the first node.

30 Claims, 6 Drawing Sheets

DETECTION OF ELECTROMAGNETIC FAULT INJECTION ATTACKS ON DIGITAL SYSTEMS

BACKGROUND

Electromagnetic fault injection ("EMFI") refers to a technique that can be used to induce anomalous behavior in electronic circuitry. In an EMFI attack, an electromagnetic signal such as a pulse is applied in close proximity to a target circuit or to one or more components of a target electronic system. Such an attack may be directed toward any of several possible objectives. The attack may seek to disable the target completely, to disturb proper operation of the target, or even to produce a predictable fault in the target, which fault may then be exploited to achieve a specific goal—such as to extract information from the target or to gain control of the target's operation. By way of example, Trouchkine, et al., in their paper titled "Electromagnetic Fault Injection Against a System-on-Chip, Toward New Micro-Architectural Fault Models," arXiv:1910.11566v1 (arXiv, October 2019), describe an exploit in which an EMFI attack targeting a system-on-chip device of a single board computer can be used to access kernel memory from an otherwise user-space process running on the computer.

Other researchers have performed experiments with EMFI attacks in an effort to discover and to enumerate the possible modes in which faults may be induced in different types of hardware. Ordas, et al., for example, in their paper titled "EM Injection: Fault Model and Locality," Fault Diagnosis and Tolerance in Cryptography, pp. 3-13 (HAL Open Science, September 2015), describe a "sampling fault" mode in which an EM pulse with sufficient magnitude may modify the amplitude of one or more inputs to a D-type flip flop circuit. The authors conclude that such a fault may, in effect, violate the gate-level setup or hold time constraints in such circuits, resulting in the erroneous transfer of input data to the outputs of the flip flop. Numerous other articles have also been published, exploring various aspects of EMFI attacks.

Despite the available research into what EMFI attacks are, and how they can be used in various types of exploits, a need exists for techniques to effectively detect such attacks on digital systems and to defend against a detected attack.

DETAILED DESCRIPTION

This disclosure describes multiple embodiments by way of example and illustration. It is intended that characteristics and features of all described embodiments may be combined in any manner consistent with the teachings, suggestions and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others. The phrase "configured to" as used herein means that the referenced item, when operated, can perform the described function. In this sense an item can be "configured to" perform a function even when the item is not operating and is therefore not currently performing the function. Use of the phrase "configured to" herein does not necessarily mean that the described item has been modified in some way relative to a previous state. "Coupled" as used herein refers to a connection between items. Such a connection can be direct or can be indirect through connections with other intermediate items. Terms used herein such as "including," "comprising," and their variants, mean "including but not limited to." Articles of speech such as "a," "an," and "the" as used herein are intended to serve as singular as well as plural references except where the context clearly indicates otherwise.

Techniques for Detecting EM Fault Injection Attacks

Figure 1:
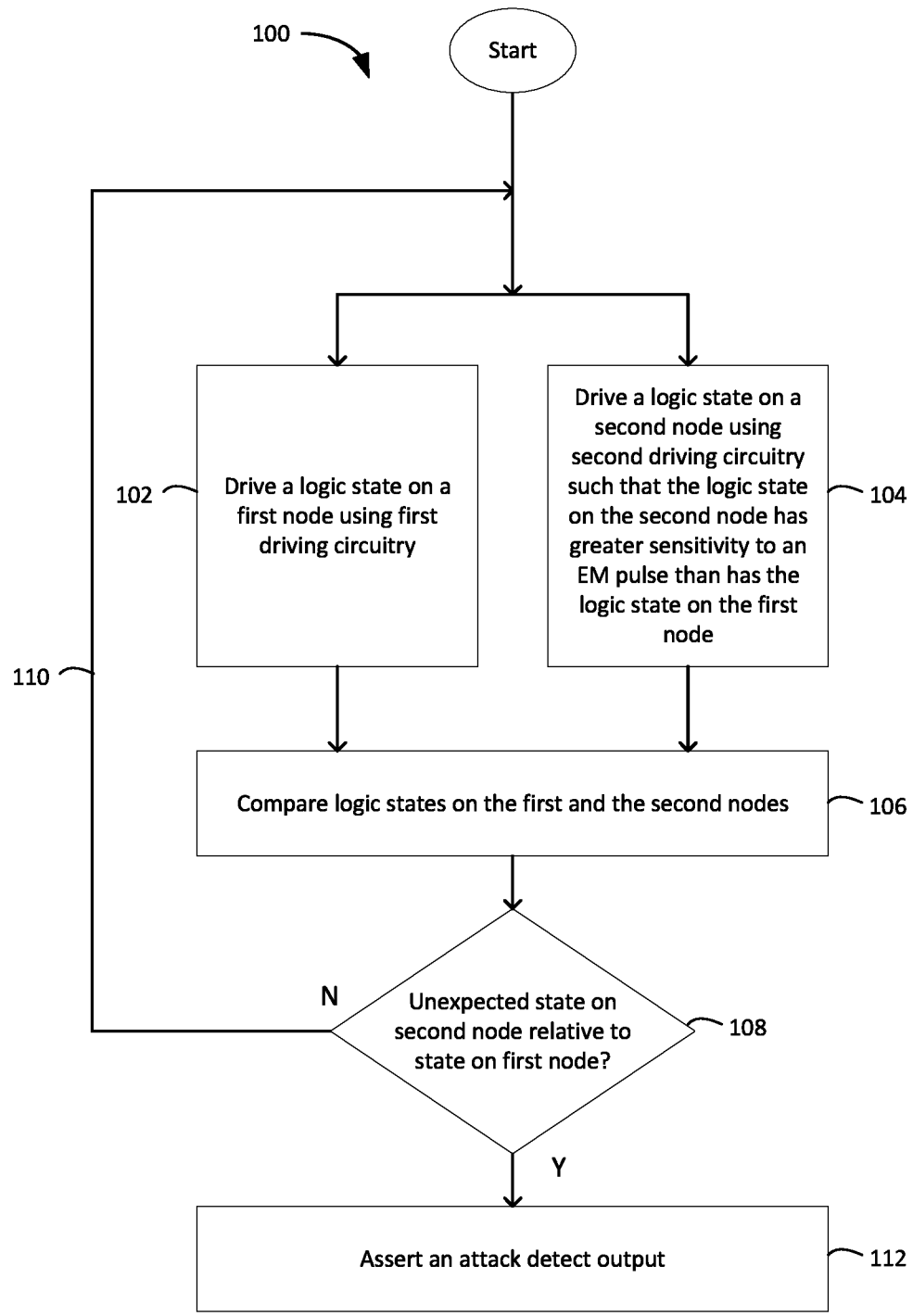
FIG. 1 is a flow diagram illustrating an example method in accordance with embodiments for detecting EMFI attacks on a digital system.

FIG. 1 is a flow diagram illustrating an example method 100, in accordance with embodiments, for detecting EMFI attacks on a digital system. At step 102, first driving circuitry is used to drive a logic state on a first node. At step 104, second driving circuitry is used to drive a logic state on a second node. In various embodiments, step 104 may be performed simultaneously or nearly simultaneously with step 102. At least one of steps 102 and 104 is performed in such a manner that the logic state on the second node is more sensitive to an EM pulse than is the logic state of the first node. Achieving the greater sensitivity of the second node to the EM pulse may be accomplished using a variety of techniques, several illustrative examples of which will be described in more detail below.

At step 106, the logic states on the first and second nodes are compared. If the logic state on the second node is as expected relative to the logic state on the first node, then the process may repeat, as indicated at 108 and 110. For example, in a given implementation in which the logic states of the two nodes are expected to be the same during normal operation, then the process may repeat if the nodes are determined to have the same value at steps 106 and 108. In an implementation in which the logic states of the two nodes are expected to be opposite during normal operation, then the process may repeat if the nodes are determined to have opposite values at steps 106 and 108. For implementations in which the two logic states are expected to be the same, the comparison may be implemented using a logical exclusive OR operation. For implementations in which the two logic states are expected to be different, the comparison may be implemented using a logical exclusive NOR operation. Other implementations may also be used.

The logic states driven on each of the two nodes may differ from one iteration of the process to the next. For example, in the absence of an EM pulse, the logic states on each node may toggle between a logical zero state and a logical one state on successive iterations of the process.

If, during the comparison step, the logic state on the second node is determined to be unexpected relative to the logic state on the first node, then an attack detect output may be asserted, as indicated at step 112. Responsive to an assertion of the attack detect output, a host system, or the target system itself, may take one or more of various possible defensive actions. For example, the host or the target system may halt one or more system clocks, or may initiate a reset of the host or the target system, or may generate an error message, or may do any combination of these.

Figure 2:
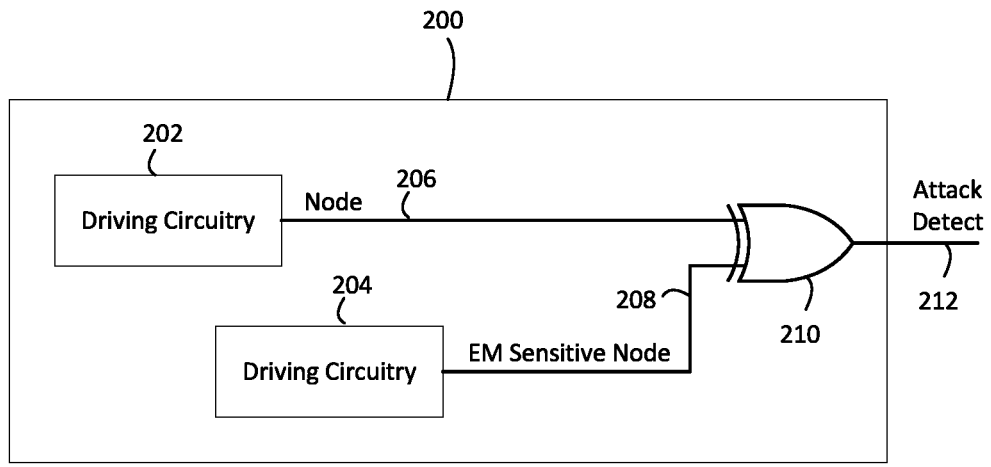
FIG. 2 is a block diagram schematically illustrating an example EMFI detector, in accordance with embodiments, that may be used to implement the method of FIG. 1.

FIG. 2 is a block diagram schematically illustrating an example EMFI detector 200, in accordance with embodiments, that may be used to implement method 100. The illustrated detector includes first driving circuitry 202 and second driving circuitry 204. The two driving circuits may take any form suitable for driving a logic state on a node given the nature of a host system in which the detector will be deployed. As illustrated, driving circuitry 202 drives a logic state on a first node 206, and driving circuitry 204 drives a logic state on a second node 208. The second driving circuitry is configured to drive node 208 in such a manner that the logic state on that node has greater sensitivity to an EM pulse than has the logic state on node 206. For this reason, node 208 may be referred to herein as an "EM sensitive node" to indicate that the logic state driven on this node has greater sensitivity to an EM pulse than does the logic state driven on node 206. Comparison circuitry 210 is coupled to both of the first and the second nodes, and is operable to assert an attack detect output 212 responsive to sensing an unexpected logic state on node 208 relative to the logic state on node 206. In the embodiment shown, the nodes are expected to have the same value during normal operation, so the comparison circuitry is implemented using an exclusive OR gate. As was mentioned above, however, different types of comparison circuitry may be used depending on the expected logic states of the two nodes in the absence of an EM pulse. In either case, the function of the comparison circuitry is to detect an anomalous condition wherein the logic state of the EM sensitive node is not as expected given the logic state of the other node.

In some embodiments, driving circuitry 202 may be designed such that the logic state driven on node 206 has substantially equal sensitivity to an EM pulse as has the circuitry of a host digital system in which the detector is to be deployed. Such a host system may be referred to herein as a "target" digital system, because it is the host digital system that may become the target of an EMFI attack. As such, it is the target digital system that the EMFI detector seeks to protect. The detector does so by asserting the attack detect output so that the target digital system or a host system may take a defensive action, as was described above.

A target digital system may take a wide variety of forms—each of which could potentially be vulnerable to an EMFI attack. For example, a target digital system may take the form of an integrated circuit package that contains one or more digital subsystems such as one or more processing units. The processing units may comprise, for example, a microprocessor and/or a graphics processing unit ("GPU"). A target digital system may also take the form of a printed circuit board on which one or more such digital subsystems are mounted. Many other forms of target digital systems are also possible, as will be apparent to persons having skill in the art and having reference to this disclosure.

In some embodiments, a plurality of EMFI detectors may be distributed within the circuitry of a target digital system or may be disposed spatially proximate to such circuitry. By way of example, the inventors hereof have determined that, for EM pulses produced using a probe tip, an effective spatial scope of the EM pulse may be on the order of 0.5 mm to 1 mm from the probe tip. Thus, in some embodiments, detectors may be placed either inside a functional block of the target system circuitry or within approximately 1 mm of such a functional block.

Figure 3:
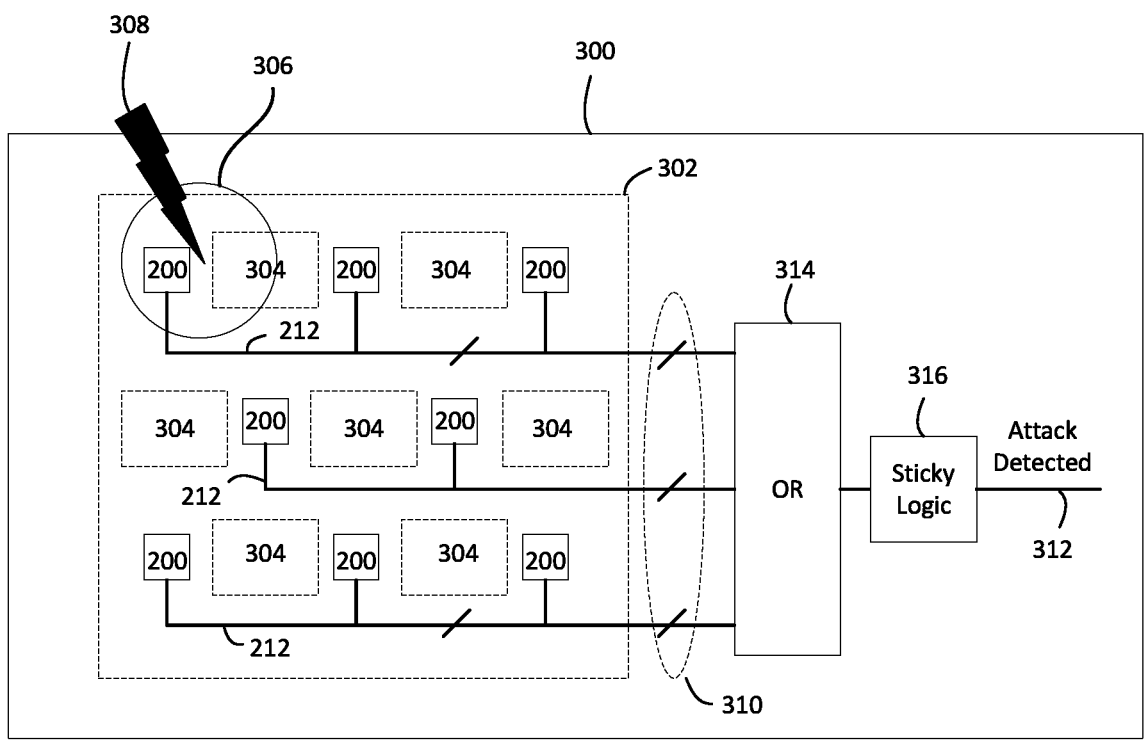
FIG. 3 is a block diagram schematically illustrating plural EMFI detectors distributed within the circuitry of a target digital system, or disposed spatially proximate to such circuitry, in accordance with embodiments.

FIG. 3 illustrates one such embodiment by way of example. In the embodiment of FIG. 3, a target digital system 300 contains circuitry 302 for which protection is sought against EMFI attacks. Circuitry 302, in turn, contains numerous function blocks 304. The target digital system 300 may correspond, for example, to an integrated circuit package, and functional blocks 304 may correspond to various components of a microprocessor or GPU 302 contained within the integrated circuit package. Numerous EMFI detectors 200 may be disposed within the circuitry 302 and/or within the functional blocks 304, or may be disposed proximate to the circuitry and/or the functional blocks, as illustrated. By way of further example, each detector may be disposed within approximately 1 mm of a relevant component of circuitry or functional block, as illustrated by circle 306. Circle 306 represents an expected spatial scope of an EM pulse 308 having a diameter of approximately 2 mm and directed toward the target digital system.

The respective attack detect outputs 212 from each of the plural detectors 200 may be routed, as shown at 310, to any suitable aggregation circuitry to produce a global attack detected output 312. The global attack detected output, if asserted, signifies that an EMFI attack has been attempted somewhere within the circuitry of the target digital system. In the embodiment illustrated, the aggregation circuitry is formed using a multi-input OR gate 314 having its inputs coupled to the detector outputs. The output of the OR gate is, in turn, coupled to the input of sticky logic 316. The sticky logic asserts the global attack detected output, and keeps it asserted, if any one of the individual detector outputs has been asserted. Responsive to an assertion of the global attack detected output, the target digital system or a host system associated with the target digital system may take a defensive action.

Figure 4:
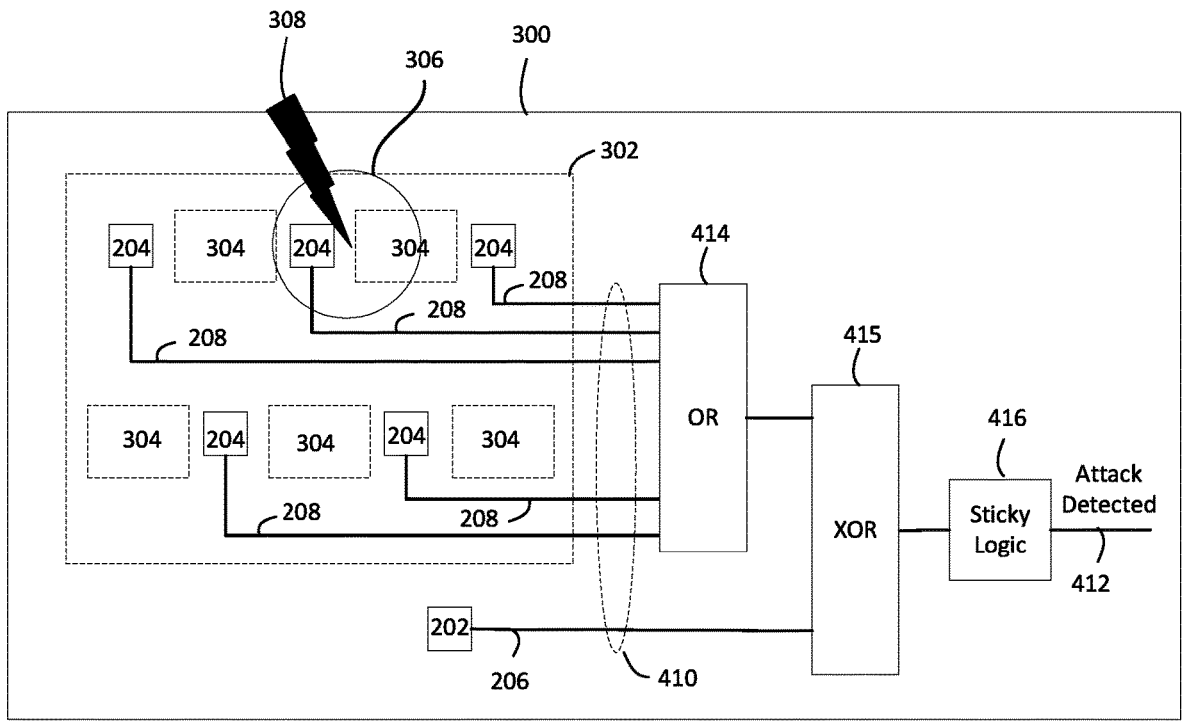
FIG. 4 is a block diagram schematically illustrating plural EM sensitive nodes distributed within the circuitry of a target digital system, or disposed spatially proximate to such circuitry, in accordance with embodiments.

In still other embodiments, the two nodes of the detectors may be spatially separated such that only the EM sensitive nodes are disposed inside of or proximate to the circuitry or functional blocks of the target digital system. An instance of the latter type of embodiment is illustrated in FIG. 4 by way of example. In the embodiment of FIG. 4, plural instances of driver circuitry 204 may be distributed within the target digital system in a similar manner as are the plural detectors of FIG. 3. One or more instances of driving circuitry 202 may be disposed in any convenient location. For example, in the embodiment of FIG. 4, a single instance of driving circuitry 202 is shown disposed adjacent to circuitry 302. In such an embodiment, the EM sensitive nodes 208 corresponding to the multiple instances of driving circuitry 204, and the output node 206 corresponding to the single instance of driving circuitry 202, may be coupled to suitable aggregation circuitry as shown at 410. In the example embodiment, the EM sensitive nodes are coupled to inputs of a multi-input OR gate 414. Node 206, and the output of OR gate 414, are coupled to the inputs of an exclusive OR ("XOR") gate 415. The output of the XOR gate is coupled to the input of sticky logic 416. As was the case with the embodiment of FIG. 3, sticky logic 416 will assert a global attack detected output 412 if the logic states on any of the EM sensitive nodes is determined to be unexpected relative to the logic state on node 206. The global attack detected output 412 thus signifies that an EMFI attack has been attempted against the target digital system.

As persons having skill and having reference to this disclosure will appreciate, other techniques are also possible for distributing the detectors and/or the EM sensitive nodes in and around the circuitry of a target digital system, as well as for aggregating the output signals corresponding to the nodes and/or the detectors.

Techniques for Implementing EM Sensitive Nodes in Detectors

Several example techniques will now be described for causing the logic state of one node in an EMFI attack detector to have greater sensitivity to an EM pulse than the logic state on the other node in the detector.

Applying a Slower Slew Rate Clock to One of Two Clocked Elements

A first such technique may be applied in embodiments in which driving circuitry 202 and driving circuitry 204 take the form of clocked elements. The inventors hereof have determined that the logic state on an output node of a clocked digital element becomes more sensitive to an EM pulse as the slew rate of the corresponding clock signal decreases. The term "slew rate" as used herein refers to a change in voltage level per unit of time. Thus, as the clock slew rate decreases, the rate of change in the clock signal voltage level becomes slower. Consequently, more time elapses during the transition of the clock from one logic level to the other logic level (e.g., from a logic zero to a logic one for elements that are clocked by a rising edge, or from a logic one to a logic zero for elements that are clocked by a falling edge). Because the presence of an EM pulse can cause instability in the voltage levels of signals that are internal to the clocked element, an output node of the clocked element becomes more likely to capture and hold an erroneous value when more time elapses during the transition of the clock signal from one logic state to another and an EM pulse is present.

Figure 5:
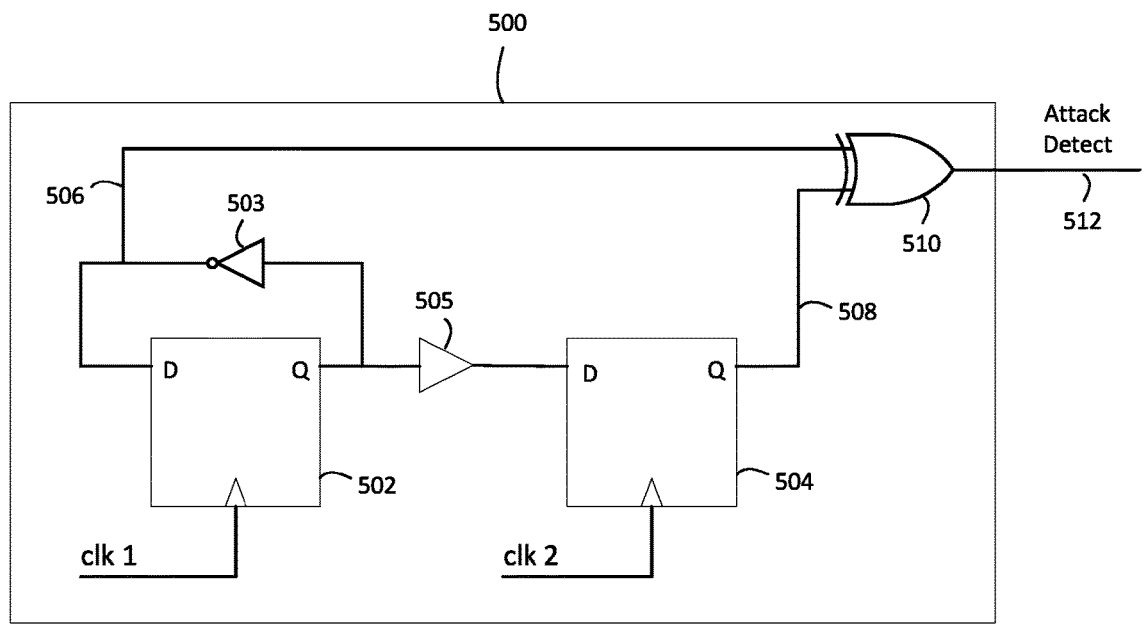
FIG. 5 is a block diagram schematically illustrating an example EMFI detector implemented using clocked elements, in accordance with embodiments, wherein the clock applied to one element has a slower slew rate than has the clock applied to the other element.

FIG. 5 illustrates an example detector 500 that operates according to this principle. In detector 500, a D type flip flop 502 and an inverter 503 correspond to driving circuitry 202, while D type flip flop 504 corresponds to driving circuitry 204. The flip flops shown are illustrative of a variety of different types of clocked elements that may be used in various embodiments. Node 506 corresponds to node 206 of FIG. 2, and node 508 corresponds to EM sensitive node 208 of FIG. 2. Two different clock signals, clk1 and clk2, are applied to flip flops 502 and 504, respectively, as shown. In this category of embodiments, the slew rate of clock signal clk2 is slower than is the slew rate of clock signal clk1. By applying the clock signal with the slower slew rate to the clk2 input, the logic state of output node 508 is made more sensitive to an EM pulse than is the logic state of output node 506.

Figure 6:
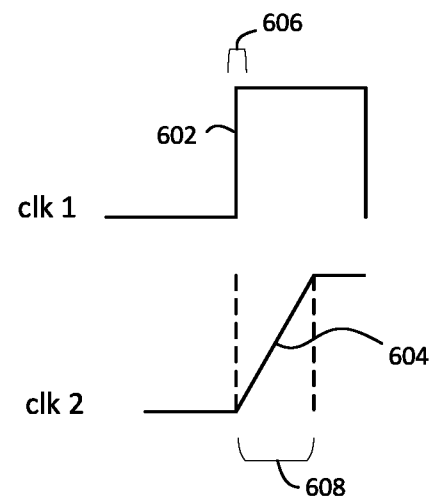
FIG. 6 is a timing diagram illustrating example clock signals that may be used with the embodiment of FIG. 5.

FIG. 6 illustrates an example set of clk1 and clk2 signals that may be used in such embodiments. The clock signals shown here are merely for the purpose of explanation. In various embodiments, the slew rates and logic levels of the clock signals applied need not be identical to those illustrated. In FIG. 6, clock signal clk1 features a relatively fast rising edge 602 that transitions from a logic zero state to a logic one state over the relatively short time period 606. Clock signal clk2, on the other hand, features a slower rising edge 604 that transitions from a logic zero state to a logic one state over the relatively longer time period 608. Clock signal clk2 may be said to have a slew rate that is slower than the slew rate of clock signal clk1 because the rising edge transition time of clk2 is longer than the rising edge transition time of clk1. Despite the difference in slew rates, however, clk1 and clk2 have the same clock period, and therefore oscillate at the same clock frequency.

By virtue of the inverter 506 coupled between the Q output of flip flop 502 and the D input of the same flip flop, flip flop 502 is configured to toggle the logic state of its Q output with each rising edge of clk1. In other words, responsive to each rising edge of clk1, the Q output of flip flop 502 will toggle from a logic zero to a logic one, or from a logic one to a logic zero. The D input of flip flop 504 is coupled to the Q output of flip flop 502 through a delay element 505. Comparison circuitry, which in this embodiment comprises exclusive OR gate 510, is configured to compare the logic state of node 508 with the logic state of node 506. (The logic state on node 506 represents the inverse of the Q output of flip flop 502.) Thus, attack detect output 512 represents the XOR of the Q output of flip flop 504 and the inverse of the Q output of flip flop 502.

During normal operation (that is, in the absence of an EM pulse), flip flop 504 will capture the previous state of flip flop 502 with each rising edge of clk1 and clk2. Because the slew rate of clk2 is slower than that of clk1, delay element 505 is provided to ensure that flip flop 504 accurately captures the Q output of flip flop 504 during each clock cycle. In various embodiments, the delay introduced by delay element 505 may be at last as long as the difference between the slew rates of clk1 and clk2. In other words, the delay may be at least as long as the difference between time period 608 and time period 606.

Figure 7:
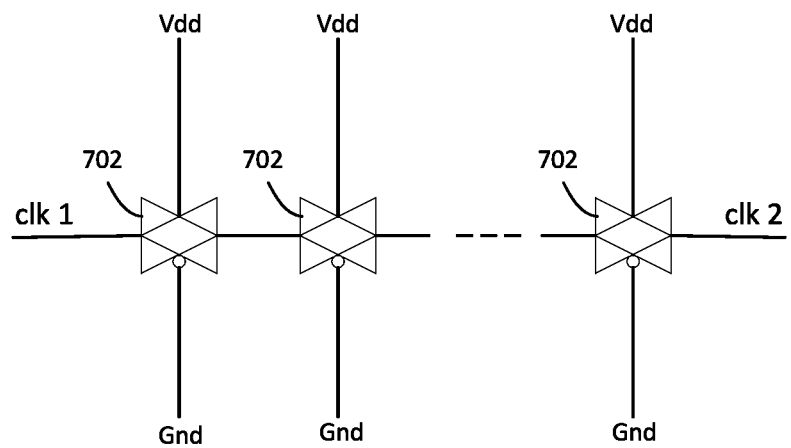
FIG. 7 is a schematic diagram illustrating an example method for deriving one of the clock signals of FIGS. 5 and 6 from the other clock signal, in accordance with embodiments.

Clock signals clk1 and clk2 may be generated using any suitable technique. FIG. 7 illustrates one such technique by way of example. In the embodiment of FIG. 7, clk2 may be derived from clk1 by passing clk1 through one or more cascaded (series connected) transmission gates 702, as shown. In such embodiments, clk2 will exhibit slower rise and fall times than clk1 because the transmission gates introduce resistance and parasitic capacitance into the path of the signal. In embodiments, the number of transmission gates used may vary as needed to create an appropriately slow slew rate for the clocked element that is to be associated with the EM sensitive node.

Coupling One of Two Driving Circuitries to a Weaker Power Header

Figure 8:
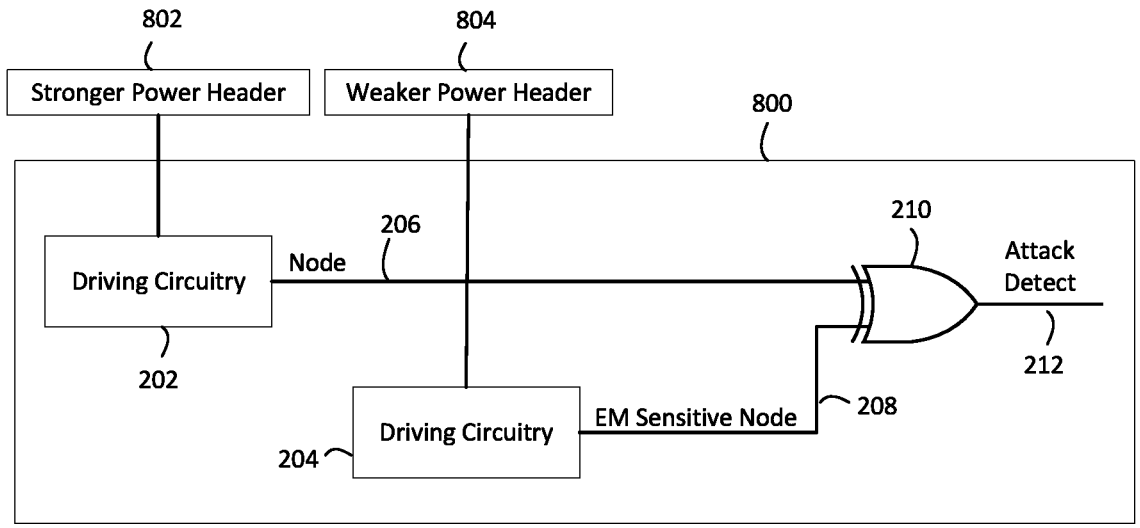
FIG. 8 is a block diagram schematically illustrating an example EMFI detector implemented by coupling one of two driving circuits to a weaker power header than the other driving circuit, in accordance with embodiments.

A second technique for implementing an EM sensitive node will now be described with reference to FIG. 8. The inventors hereof have determined that a weak power header is another factor that can cause the output of a digital element to exhibit an erroneous value in the presence of an EM pulse. As used herein, the phrase "weaker power header" means a power header having more internal resistance than that of another power header. Conversely, the phrase "stronger power header" means a power header having less internal resistance than that of another power header.

In general, the supply voltage provided by any power header will vary to some degree as the amount of current drawn from the power header varies. This is due to the basic relationship V=RI, where V is the supply voltage provided by the power header, I is the instantaneous current drawn from the power header, and R is the internal resistance of the power header. Given a finite internal resistance in a power header, the supply voltage provided by the power header will drop as the instantaneous current drawn from the power header increases. Moreover, the presence of an EM pulse can introduce a significant dI/dt within the circuitry of a digital element that is coupled to such a power header. Thus, in the present of an EM pulse, a digital element that is coupled to a weaker power header will experience a larger variation in supply voltage than will another digital element that is coupled to a stronger power header.

In detector 800, driving circuitry 204 is coupled to a weaker power header than is driving circuitry 202. Specifically, driving circuitry 204 is coupled to weaker power header 804, while driving circuitry 202 is coupled to a stronger power header 802. Consequently, a logic state on node 208 will be more sensitive to an EM pulse than will be a logic state on node 206. In various embodiments, power header 802 need not be stronger than the power headers that supply circuitry within the target digital system, although it may be. In embodiments that are constructed according to the principle illustrated in FIG. 8, the EM sensitive node 208 is driven more weakly than is node 206, by virtue of the weaker power header that supplies the driving circuitry for node 208.

Coupling One of Two Driving Circuits to a Lower Supply Voltage

Figure 9:
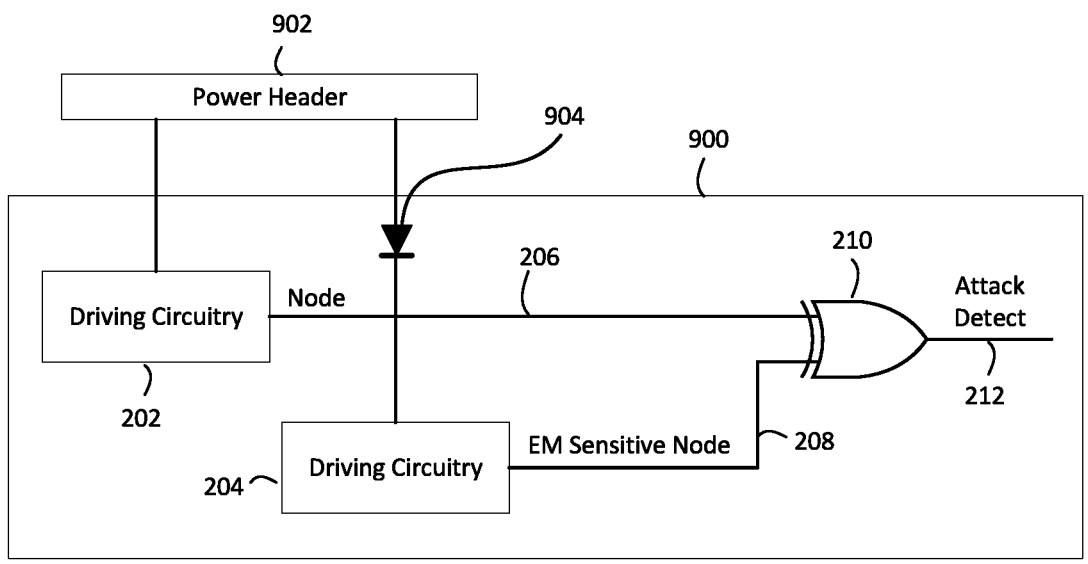
FIG. 9 is a block diagram schematically illustrating an example EMFI detector implemented by coupling one of two driving circuits to a lower supply voltage than the other driving circuit, in accordance with embodiments.

A third technique for implementing an EM sensitive node will now be described with reference to FIG. 9. A given driving circuit will drive its output node more strongly when the circuit is coupled to a higher supply voltage than it will be if coupled to a lower supply voltage. Therefore, for the same reasons described above, by coupling one of two driving circuits to a lower supply voltage than the other driving circuit, the output driven by the circuit having the lower supply voltage will be more sensitive to an EM pulse than the output driven by the other circuit.

Providing a lower supply voltage to a driving circuit of an EMFI detector can be accomplished using any suitable technique. FIG. 9 illustrates one such technique by way of example. In EMFI detector 900, driving circuitry 202 and driving circuitry 204 are both coupled to the same power header 902. Driving circuitry 204, however, is coupled to the power header through one or more diodes 904 connected in series from the power header to the driving circuit. Because each such diode provides a voltage drop (e.g., 0.7 volts in the case of an Si diode), the supply voltage provided to driving circuit 204 will be lower than the supply voltage provided to driving circuit 202. As a consequence, the logic state on node 208 will be more sensitive to an EM pulse than will be the logic state on node 206.

Using Longer FET Channels in One of Two Driving Circuits

A fourth technique for implementing an EM sensitive node will now be described with reference to FIG. 10. It is common in digital circuits to drive an output node with a pair of field effect transistors ("FETs"). For example, an output node may be driven by a p-channel FET and an n-channel FET whose channels are connected in series from Vdd to ground. In such an arrangement, the gates of the two FETs are both coupled to an input node, and the output is taken from the node between the two FET channels. When the p-channel FET is coupled to Vdd and the n-channel FET is coupled to ground, the output node will be inverted relative to the input node. Thus, FETs connected in this manner implement an inverting driver. When the n-channel FET is coupled to Vdd and the p-channel FET is coupled to ground, the output node will have the same logic level as the input node. Thus, FETs connected in the latter arrangement implement a non-inverting driver.

Assume for the sake of explanation that two such driving circuits are coupled to the same supply voltage, but one of the driving circuits is implemented with FETs having longer channels than the corresponding FETs in the other driving circuit. Under these circumstances, the driving circuit that is implemented using the longer FET channels will drive its output node more weakly than the driving circuit that is implemented using the shorter FET channels. This is due to the facts that (1) longer FET channels exhibit a higher "on" resistance than do shorter FET channels, and (2) the output node of the driving circuit must be pulled high or low by one of the two FET channels. The voltage level on an output node that is pulled high or low weakly (that is, by a larger resistor) is more likely to be influenced by external forces such as an EM pulse than is an output node that is pulled high or low more strongly. It follows from this that an output node that is driven by longer-channel FETs will be more sensitive to an EM pulse than an output node that is driven by short-channel FETs.

Figure 10:
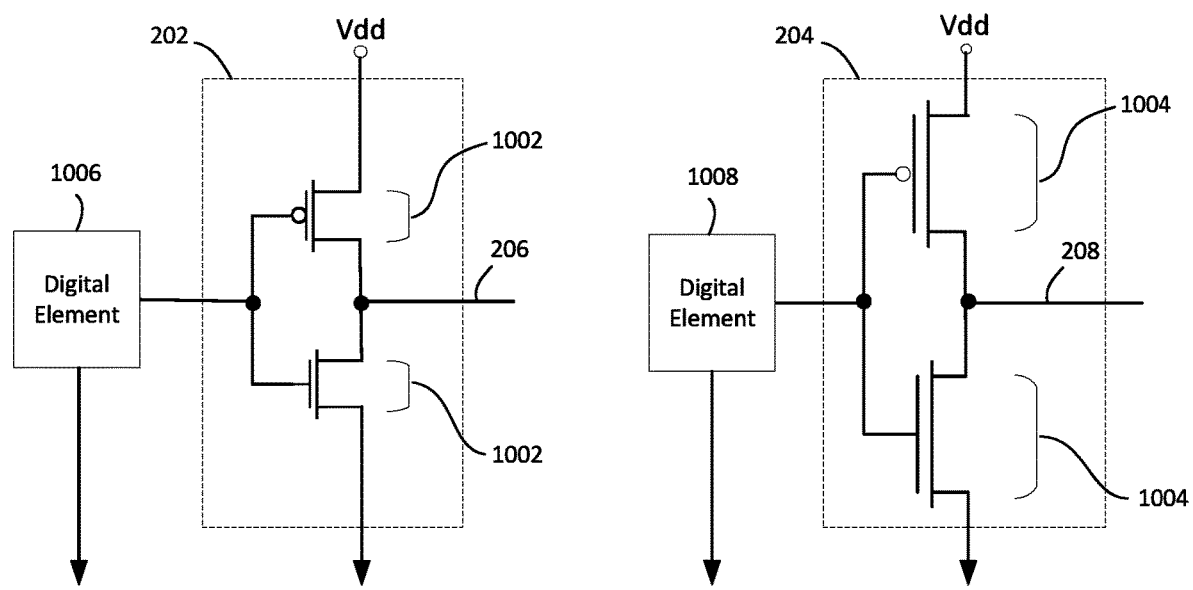
FIG. 10 is a block diagram schematically illustrating an EM sensitive node implemented by using FETs in one driving circuit having longer channel lengths than corresponding FETs in another driving circuit, in accordance with embodiments.

FIG. 10 illustrates an example embodiment in which an EM sensitive node is implemented in accordance with this principle. Driving circuits 202 and 204 in the embodiment of FIG. 10 are both implemented as inverting drivers, with a p-channel FET coupled to Vdd and a n-channel FET coupled to ground. Outputs 206 and 208 are taken from the nodes between the FET channels of the respective driving circuits, as shown. Driving circuit 202 is implemented using FETs having channel lengths 1002, while driving circuit 204 is implemented using FETs having channel lengths 1004. Because channel lengths 1004 are longer than channel lengths 1002, the logic state on output node 208 will be more sensitive to an EM pulse than will be the logic state on output node 206, for the reasons described above. Digital elements 1006, 1008 may correspond to any type of circuit having a digital output. In some embodiments, digital elements 1006, 1008 may be the same element, such that the inputs of driving circuits 202 and 204 are coupled to the same node.

Other Techniques

Persons having skill in the art and having reference to this disclosure will appreciate that the above techniques are provided by way of example only, and that other techniques may also be employed to implement an EM sensitive node in an EMFI detector. For example, a first driving circuit may be implemented using FETs having a lower threshold voltage, $Vt_1$, while a second driving circuit may be implemented using FETs having a higher threshold voltage, $Vt_2$. In such embodiments, and for reasons similar to those described above, the output node driven by the higher threshold FETs will be more sensitive to an EM pulse than the output node driven by the lower threshold FETs.

Example Sticky Logic

Figure 11:
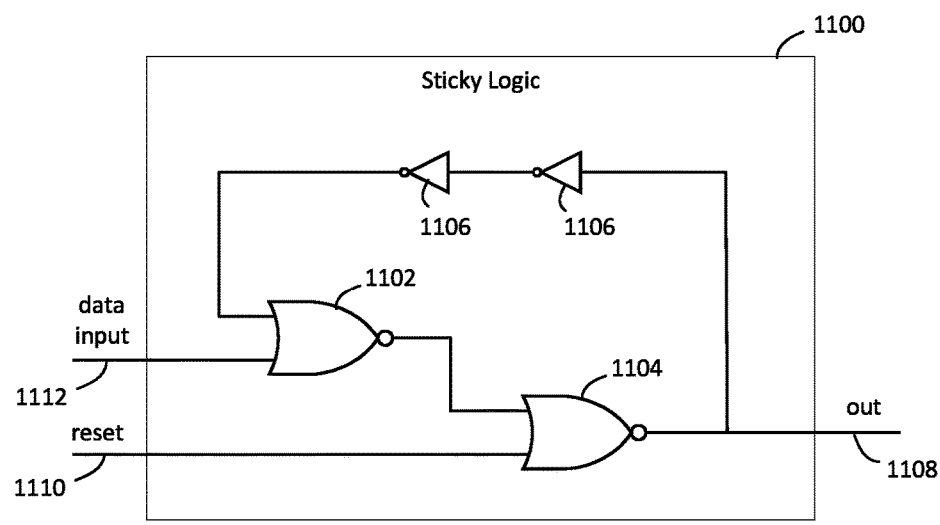
FIG. 11 is a schematic diagram illustrating an example sticky logic circuit suitable for use with embodiments.

For embodiments such as those described above that employ sticky logic to capture and hold an assertion of an attack detect output of an EMFI detector, the sticky logic may be implemented in any suitable manner. FIG. 11 illustrates one such implementation by way of example. In the embodiment of FIG. 11, sticky logic 1100 implements a single-bit memory by virtue of the cycle created by NOR gates 1102, 1104 and inverters 1106. Output 1108 is pulled low responsive to an assertion on reset input 1110. After the reset input goes low, any assertion on data input 1112 causes output 1108 to become asserted and to remain so until another assertion on the reset input. Other implementations are also possible.

Tuning EMFI Detector Parameters to Fit Applications

The EMFI detector parameters described above may be varied to fit the requirements for a given target system. It may be desirable, for example, to tune the sensitivity of an EMFI detector such that, when deployed in a particular target system, the detector is sensitive enough to detect EMFI attacks, but not so sensitive that it produces false positive assertions on the attack detect output. For example, both the supply voltage provided to the detector and the transition time (slew rate) of the clock signal corresponding to the EM sensitive node logic may be varied to achieve a desired level of sensitivity. At a given supply voltage, the slew rate of the clock signal applied to the EM sensitive node logic can be made slower (in other words, the clock transition time can be made longer) to increase the sensitivity of the detector. Conversely, at a given supply voltage, the slew rate of the clock signal applied to the EM sensitive node logic can be made faster (in other words, the clock transition time can be made shorter) to decrease the sensitivity of the detector. Similarly, at a given slew rate for the clock signal applied to the EM sensitive node logic, the supply voltage applied to the detector can be made lower to increase the sensitivity of the detector, or can be made higher to decrease the sensitivity of the detector. Additionally, more EMFI detectors may be deployed within a target system to increase the spatial sensitivity of EMFI detection, or fewer detectors can be deployed in applications for which decreased spatial sensitivity of EMFI detection is acceptable. Other parameters may also be varied.

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may generally be performed in any order, and some steps may be omitted, while other steps may be added, except where the context clearly indicates otherwise. Similarly, components in structures described herein may be combined or arranged in different positions or locations, and some components may be omitted, while other components may be added, except where the context clearly indicates otherwise. The scope of the disclosure is intended to include all such combinations, modifications, and generalizations as well as their equivalents.

What is claimed is:

1. Apparatus for detecting an electromagnetic ("EM") fault injection attack directed toward circuitry in a target digital system, comprising:
    a first node coupled to first driving circuitry such that the first driving circuitry, when in operation, drives a logic state of the first node;
    a second node coupled to second driving circuitry such that the second driving circuitry, when in operation, drives a logic state of the second node;
    wherein the first driving circuitry and the second driving circuitry are configured such that the logic state of the second node has greater sensitivity to an EM pulse than has the logic state of the first node;
    an attack detect output; and
    comparison circuitry coupled to the first and the second nodes and operable to assert the attack detection output if the logic state of the second node is unexpected relative to the logic state of the first node.

2. The apparatus of claim 1, wherein:
    the first node corresponds to an output of a first clocked element;
    the second node corresponds to an output of a second clocked element;
    the first clocked element is coupled to a first clock signal having a first clock slew rate;
    the second clocked element is coupled to a second clock signal having a second clock slew rate slower than the first clock slew rate; and
    the greater sensitivity of the logic state of the second node to the EM pulse is due at least in part to the second clock slew rate being slower than the first clock slew rate.

3. The apparatus of claim 2, wherein:
    the first clocked element comprises a first flip-flop configured to toggle a logic state of a first logic output responsive to the first clock signal;
    the second clocked element comprises a second flip flop having a second logic input and a second logic output;
    the second logic input is coupled to the first logic output through a delay element; and
    the comparison circuitry comprises an exclusive OR of the second logic output and an inverse of the first logic output.

4. The apparatus of claim 3, wherein:
    a delay introduced by the delay element is at least as long as a difference between the first clock slew rate and the second clock slew rate.

5. The apparatus of claim 2, wherein:
    the second clock signal is derived by passing the first clock signal through one or more series connected transmission gates.

6. The apparatus of claim 1, wherein:
    the second driving circuitry is disposed inside or proximate to a physical area corresponding to the circuitry in the target digital system.

7. The apparatus of claim 1, wherein:
    the logic state of the first node has substantially equal sensitivity to the EM pulse as has the circuitry in the target digital system.

8. The apparatus of claim 1, wherein:
    the first driving circuitry comprises at least a first field effect transistor having a first channel length;

the second driving circuitry comprises at least a second field effect transistor having a second channel length longer than the first channel length; and the greater sensitivity of the logic state of the second node to the EM pulse is due at least in part to the second channel length being longer than the first channel length.

9. The apparatus of claim 1, wherein:

the first driving circuitry is coupled to a first supply voltage;

the second driving circuitry is coupled to a second supply voltage lower than the first supply voltage; and the greater sensitivity of the logic state of the second node to the EM pulse is due at least in part to the second supply voltage being lower than the first supply voltage.

10. The apparatus of claim 9, wherein:

the second supply voltage is derived by passing the first supply voltage through one or more series connected diodes.

11. The apparatus of claim 1, wherein:

the first driving circuitry is coupled to a first power header;

the second driving circuitry is coupled to a second power header weaker than the first power header; and the greater sensitivity of the logic state of the second node to the EM pulse is due at least in part to second power header being weaker than the first power header.

12. The apparatus of claim 1, wherein:

the first driving circuitry comprises at least a first field effect transistor having a first threshold voltage;

the second driving circuitry comprises at least a second field effect transistor having a second threshold voltage higher than the first threshold voltage; and the greater sensitivity of the logic state of the second node to the EM pulse is due at least in part to the second threshold voltage being higher than the first threshold voltage.

13. The apparatus of claim 1:

further comprising plural instances of the first driving circuitry and the second driving circuitry, wherein the plural instances are spatially distributed within the circuitry of the target digital system; and wherein the comparison circuitry is operable to assert the attack detection output responsive to sensing that, in any of the plural instances, the logic state on the second node is unexpected relative to the logic state on the first node.

14. The apparatus of claim 1:

further comprising plural instances of the second driving circuitry and the second node, wherein the plural instances are spatially distributed within the circuitry of the target digital system; and wherein the comparison circuitry is operable to assert the attack detection output responsive to sensing that the logic state on any of the plural second nodes is unexpected relative to the logic state on the first node.

15. The apparatus of claim 1, wherein:

a first input of the comparison circuitry is coupled directly to the first node; and a second input of the comparison circuitry is directly coupled to the second node.

16. A method for detecting an electromagnetic ("EM") fault injection attack directed toward circuitry of a target digital system, comprising: driving a first node using first driving circuitry;

driving a second node using second driving circuitry;

wherein driving the first node and driving the second node are performed in a manner such that a logic state of the second node has greater sensitivity to an EM pulse than has a logic state of the first node;

comparing the logic state of the first node with the logic state of the second node; and asserting an attack detect output responsive to the logic state of the second node being unexpected relative to the logic state of the first node.

17. The method of claim 16, wherein:

comparing the logic state of the first node with the logic state of the second node comprises using comparison circuitry that has a first input coupled directly to the first node and a second input coupled directly to the second node.

18. The method of claim 16, wherein the first node corresponds to an output of a first clocked element, and the second node corresponds to an output of a second clocked element, and wherein the method further comprises:

clocking the first clocked element with a first clock signal; and clocking the second clocked element with a second clock signal having a slower slew rate than the first clock signal.

19. The method of claim 16, wherein:

driving the first node and driving the second node comprises driving the second node more weakly than driving the first node.

20. The method of claim 19, wherein:

driving the second node more weakly than driving the first node comprises driving the second node with a field effect transistor having a threshold voltage higher than that of a field effect transistor used to drive the first node.

21. The method of claim 19, wherein:

driving the second node more weakly than driving the first node comprises driving the second node while the first driving circuitry is coupled to a first supply voltage and the second driving circuitry is coupled to a second supply voltage lower than the first supply voltage.

22. The method of claim 19, wherein:

driving the second node more weakly than driving the first node comprises driving the second node while the first driving circuitry is coupled to a first power header and the second driving circuitry is coupled to a second power header weaker than the first power header.

23. The method of claim 19, wherein:

driving the first node comprises driving a first field effect transistor having a first channel length; and driving the second node comprises driving a second field effect transistor having a second channel length longer than the first channel length.

24. The method of claim 16, wherein:

driving the first node comprises driving plural instances of the first node using respective plural instances of the first driving circuitry distributed throughout the circuitry of the target digital system;

driving the second node comprises driving plural instances of the second node using respective plural instances of the second driving circuitry distributed throughout the circuitry of the digital system; and asserting the attack detection output comprises asserting the attack detection output responsive to sensing that the logic state on any of the plural second nodes is unexpected relative to the logic state on a corresponding one of the plural first nodes.

25. The method of claim 16, wherein:

driving the second node comprises driving plural instances of the second node using respective plural instances of the second driving circuitry distributed throughout the circuitry of the target digital system; and asserting the attack detection output comprises asserting the attack detection output responsive to sensing that the logic state on any of the plural second nodes is unexpected relative to the logic state on the first node.

26. The method of claim 16, wherein:

driving the first node is performed in a manner such that the logic state on the first node has substantially equal sensitivity to the EM pulse as has the circuitry in the target digital system.

27. A system, comprising:

target digital circuitry; and an electromagnetic ("EM") fault injection attack detector disposed within or proximate to the target digital circuitry;

wherein the EM fault injection attack detector comprises:

a first node coupled to first driving circuitry such that the first driving circuitry, when in operation, drives a logic state of the first node;

a second node coupled to second driving circuitry such that the second driving circuitry, when in operation, drives a logic state of the second node;

wherein the first driving circuitry and the second driving circuitry are configured such that the logic state of the second node has greater sensitivity to an EM pulse than has the logic state of the first node;

an attack detect output; and comparison circuitry coupled to the first and the second nodes and operable to assert the attack detect output responsive to sensing a logic state on the second node that is unexpected relative to a logic state on the first node.

28. The system of claim 27, wherein:

the target digital circuitry is disposed within an integrated circuit chip package.

29. The system of claim 28, wherein:

the target digital circuitry comprises a processing unit.

30. The system of claim 29, wherein:

the processing unit comprises a graphics processing unit.

* * * * *